United States Patent [19]

Mantovaara

[11] Patent Number: 5,127,882
[45] Date of Patent: Jul. 7, 1992

[54] V-BELT PULLEY AND VARIATOR

[76] Inventor: Urpo Mantovaara, Opiskelijankatu 52, SF-33720 Tampere, Finland

[21] Appl. No.: 640,291
[22] PCT Filed: Jul. 21, 1989
[86] PCT No.: PCT/FI89/00136
§ 371 Date: Jan. 22, 1991
§ 102(e) Date: Jan. 22, 1991
[87] PCT Pub. No.: WO90/01129
PCT Pub. Date: Feb. 8, 1990

[30] Foreign Application Priority Data

Jul. 21, 1988 [FI] Finland .................................. 880271

[51] Int. Cl.5 ............................................. F16H 55/00
[52] U.S. Cl. ..................................................... 474/8
[58] Field of Search ................... 474/8, 11, 12, 17, 28, 474/69, 70, 29, 25

[56] References Cited

U.S. PATENT DOCUMENTS 3,757,594 9/1973 Kumm ................................ 474/28

Primary Examiner—Thuy M. Bui
Attorney, Agent, or Firm—Larson & Taylor

[57] ABSTRACT

A variable transmission or variator uses a particular V-belt pulley. This pulley is connect to a flexible link for transmitting a driven or driving force. The pulley consists of two disklike sheaves which are variably pressed together. To reduce power losses, bearings for the sheaves assure that the sheaves are either non-loaded or not loaded parallel, but rather are variably inclined to each other. Then, the groove between the sheaves is at its maximum width approximately at the points where the belt leaves the driving pulley and comes onto the driven pulley.

21 Claims, 3 Drawing Sheets

FIG. 4
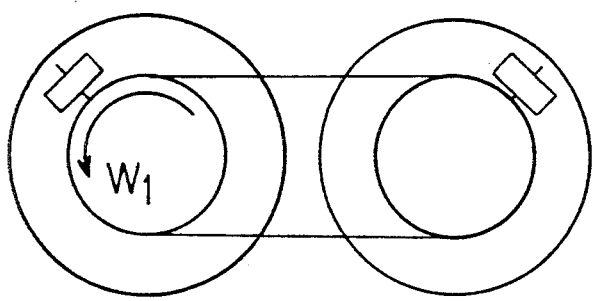
FIG. 8
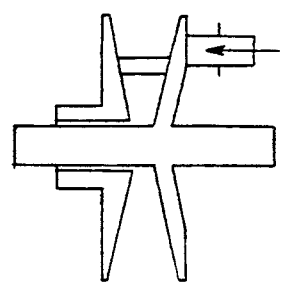
FIG. 5
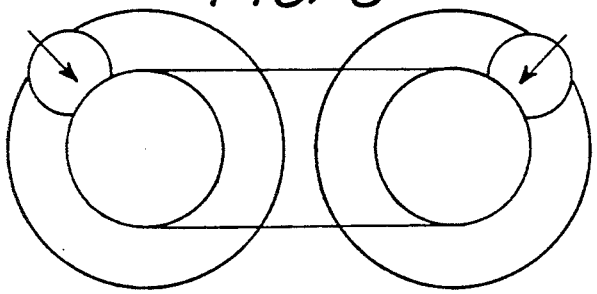
FIG. 9
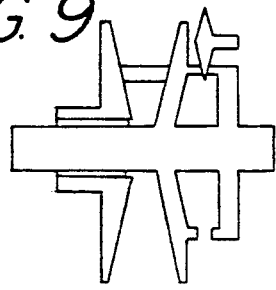
FIG. 6
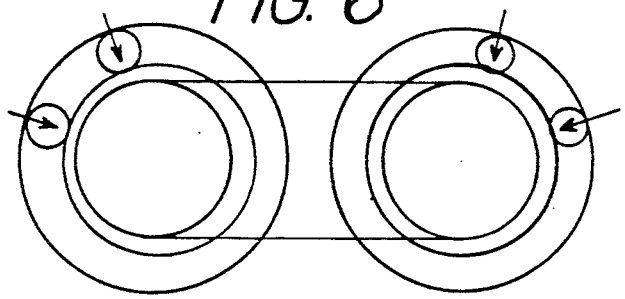
FIG. 10
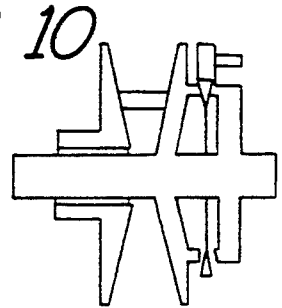
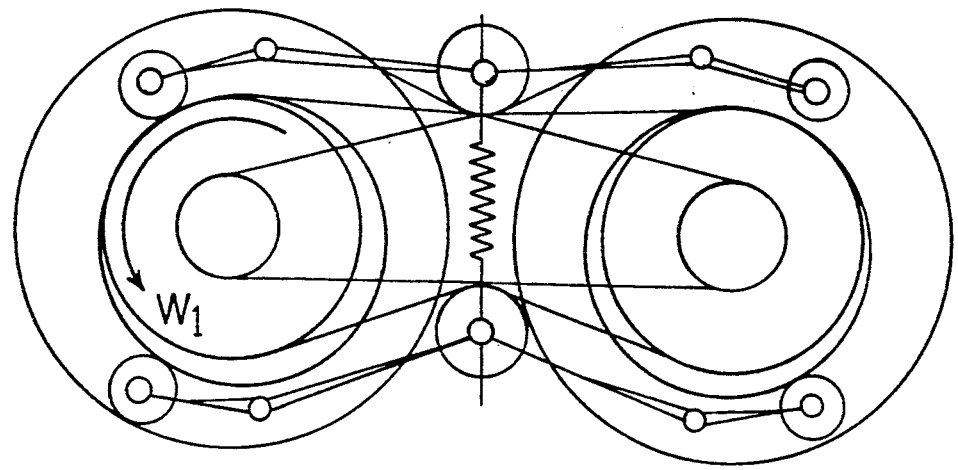
FIG. 7

V-BELT PULLEY AND VARIATOR

FIELD OF THE INVENTION

The invention concerns transmissions having a variable ratio and being adjustable or automatically self-adjusting by means of pulleys consisting of sheaves being axially movable to each other and contacting on flanks of a V-belt or a like flexible link transmitting the power. The objects of the invention are pulleys and variators including them.

BACKGROUND OF THE INVENTION

The basis of the invention is an observation that power losses between the belt and the pulleys are mainly caused by lateral clearances and resiliences of the sheaves and belt dominating in relation to the bearing losses. For this reason the V-belt variators have generally a clearly lower efficiency rate than non-variable transmissions.

The basic idea of the invention is to modify the bearings of the sheaves by such a way, that the sheaves are not parallel when they are non-loaded or the belt is missing between them, but so inclined to each other that bending load caused by the belt makes them approximately parallel.

In itself it is not a new idea to make the sheave halves of a variable pulley non-parallel. It is known for example in the patent publications U.S. Pat. No. 3757594 (F 16 H 55/52) and G. 2041116 A (F 16 H 9/12).

SUMMARY OF THE INVENTION

The solution according to this invention is deviating from both devices mentioned afore by such a way that the distance of the contact rings on the sheaves is not smallest at the middle point of the touching area, but deviates from it approximately 45° to the direction of rotation in the driven pulley and to the opposite direction in the driving pulley.

This improvement, which seems little and easy to be found, when valued afterwards, is however important, since without it no effect can be born reducing losses of the power and improving the efficiency.

The pulleys made according to the prior known inventions are functioning right only without loading torque moment. When the belt is loaded, the problems caused by its wedging and jamming can become even worse than in pulleys, where the sheaves are parallel before loading.

Particularly when the V-belt is wide or else laterally compressible the divergence of the sheaves shall be greater than required to compensate only the clearances and resiliences. In other words the distance between the sheaves shall be greatest approximately at the points, where the belt leaves the driving pulley and comes onto the driven pulley.

The sufficient total divergence is 0,1 . . . 0,4 grades or 0,0017 . . . 0,007 radians and the main means to accomplish it is to make the radial bearings eccentric and substitute the axial bearings partly or fully by rollers pushing and rolling against the rear sides of the sheaves. More in detail the characteristic features of the invention are discussed hereinbelow.

BRIEF DESCRIPTION OF THE DRAWINGS

The invention is described in the following with the aid of examples referring to the drawing attached, in which:

FIG. 4 presents schematically a V-belt variator, where the divergence of the sheaves is accomplished by support rollers substituting for the axial bearings.

FIG. 5 presents schematically a V-belt variator, where the support rollers are flat disks pressed radially between the rear sides of the sheaves and the particular supporting rings.

FIG. 6 presents an arrangement having less friction as before, where a wedge shaped ring is pressed between two conical surfaces each by means of two cylindrical support rollers.

FIG. 7 presents a construction, which is modified from the variator described afore, by such a way, that the function remains correct despite a changing direction of the loading torque moment. The supporting rollers are symmetrically located and idle rotating fixed into levers, which are steered by the tension rollers of the belt, by such a way that the roller on the tight side is going deeper and the roller on the slack side is coming outwards.

FIGS. 8 . . . 10 present the longitudinal views on planes attached with axes of the pulleys corresponding the sections described afore.

DETAILED DESCRIPTION OF THE PREFERRED EMBODIMENTS

Figure 1:
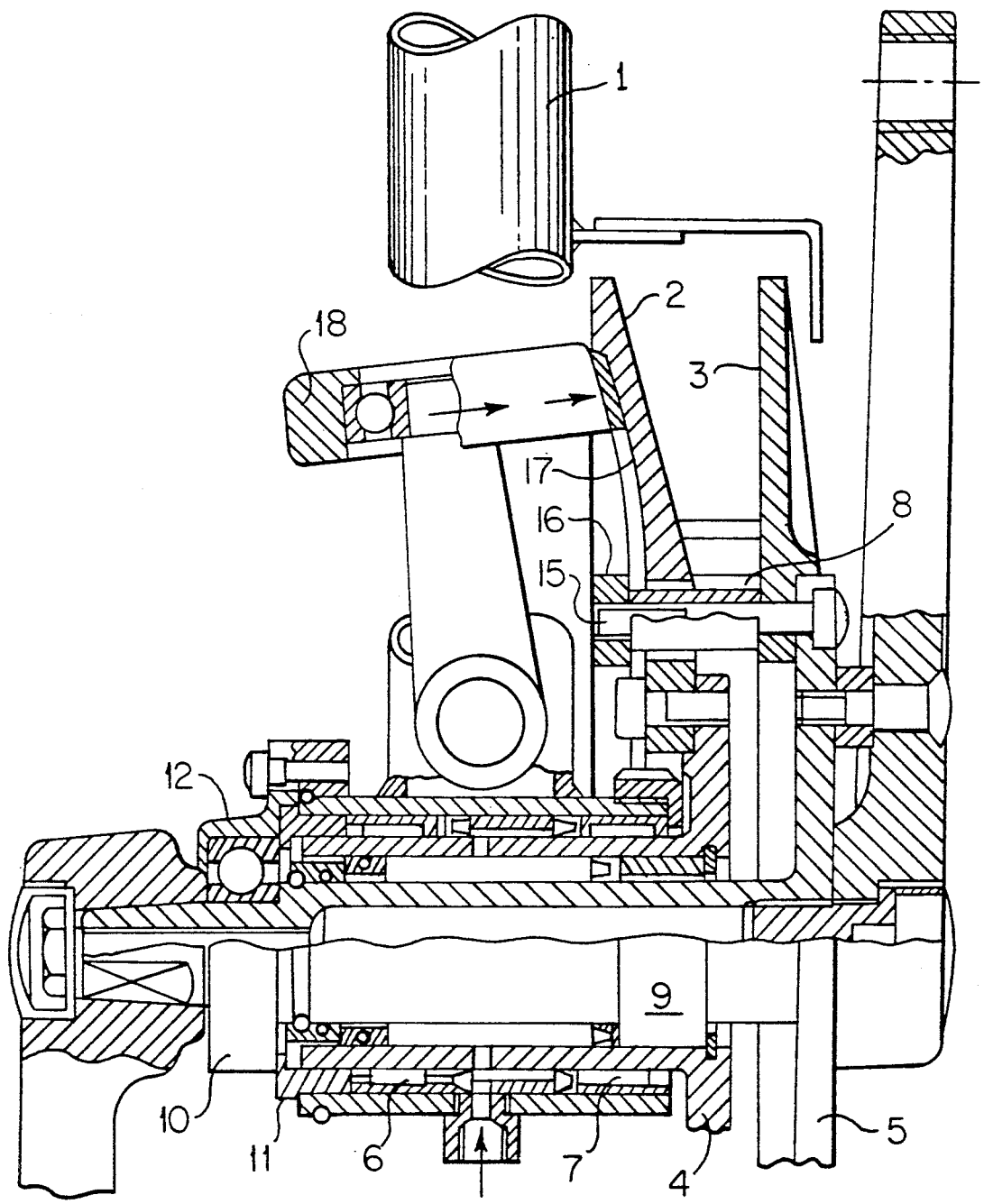
FIG. 1 presents in rear view a longitudinal section of a driving pulley of a bicycle variator according to the invention.

In the construction presented in FIG. 1 the effect according to the invention of the divergence of the sheaves (2 and 3) is caused by a bearing system consisting of the needle bearings (6 and 7) between the frame (1) and the axially moving tubular shaft (4), a sliding bearing (9) between the pedal shaft (5) and tubular shaft (4), and the ball bearing (10), which supports the left end of the pedal axle to the frame (1) by such a way that it can be regulated eccentric to every direction by means of two eccentric bushings (11 and 12). In other words, the axes of revolution of the sheaves (2,3) are rotatably variable with respect to one another in the direction or rotation of the pulley, as also shown in FIG. 7 and discussed above and below in the description of FIG. 7.

The divergence can be increased by means of the roller (18), the pressing force of which can easy be regulated according to variations of the pedal force. Another alternative for adjusting of the axial force is to lead pressurized oil into the space between the tubular shaft (4) and pedal axle (5).

Figure 2:
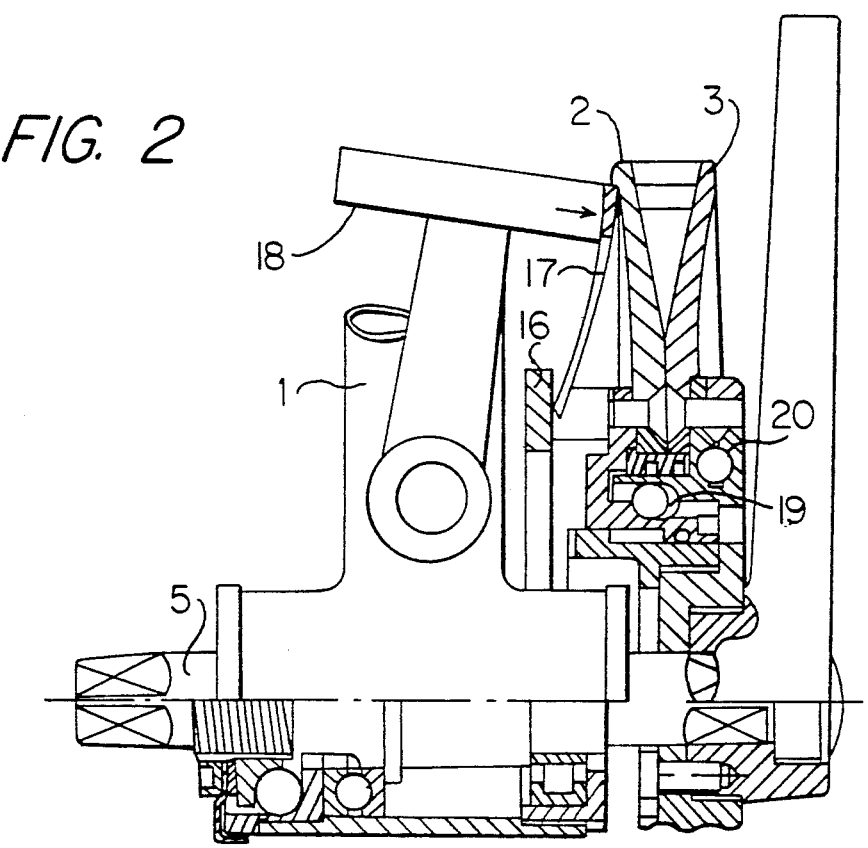
FIG. 2 presents a section of such a driving pulley, where the axial force pressing the sheaves together is produced as a sum effect of a notched cup spring, a multiple-end ball screw and a roller pressing on the outer rim of the cup spring.

In the construction presented in FIG. 2 the only mean causing the divergence is the support roller (18), the number of which can also be greater than one. The greatness of the divergence can also be affected by the clearance of the ball screw (19). This construction is fit to be made lighter and to be easier attached to normal bicycles as an auxiliary device. In a normal construction, where the joints of the axle and pedal cranks are square formed only the right crank shall be modified. The section under the axis presents an adaptation to such a construction, where the axle and cranks normally consist of only one piece. In relation to the former this construction has the disadvantage, that the production in small series would be more expensive because of the multiple-end ball screw, which must be made accurately.

With this construction, it will be appreciated that the narrowest point of the groove for the belt between the sheave halves is not located at the middle point of the contact arc of the belt. Thus, for the driving pulley, the belt groove between the sheaves is wider at the point of exit than at the point of entry of the belt, and preferably the belt touches the driving pulley at a point at least 10 degrees, or 0.17 radians before the point where the groove between the sheaves is narrowest. Conversely, for the driven pulley, the belt groove between the sheaves is narrower at the point of exit than at the point of entry of the belt, and preferably the belt touches the driven pulley at a point at least 10 degrees or 0.17 radians after the point where the groove between the sheaves is narrowest.

Figure 3:
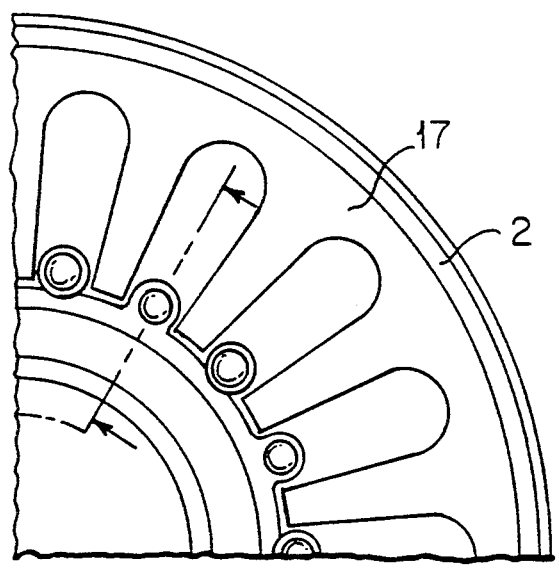
FIG. 3 presents in cross view the driving pulley as described afore and a quarter of the notched cup spring, which can be similar also in the construction as presented in FIG. 1.

FIG. 3 is aimed to visualize both constructions described afore. The cup springs and support rollers can be similar in both.

The schematic FIGS. 4 . . . 7 and the corresponding sections 8 . . . 10 give intimations at the possibilities to adapt this invention made in the development of bicycle variators to the normal V-belt variators used in vehicles and industry. The possibilities are however not confined to them, but within the scope of the claims many other variations and combinations can be developed as well for bicycles as for other applications.

As shown in FIGS. 5 and 9, the divergence of the sheaves can be caused by a freely rotating flat disc pressing or wedging radially between a specific or particular auxiliary ring and the rear side of at least one of the sheaves. Similarly in FIGS. 6 and 10, a wedge shaped ring can be pressed between two conical surfaces by means of two cylindrical support rollers to achieve the same result.

Depicted in FIG. 7 is another modified construction where the rollers adjusting the wedge ring determining the divergence of the sheaves are symmetrically placed and mounted with bearings on levers controlled by the belt tensioning rollers. Thus, the slack side comes outward so that the function remains the same regardless of the direction of the loading torque moment.

Also the constructions according to the schematic FIGS. 4 and 5 can be modified by using two or three rollers so, that changing direction of the loading torque moment does not disturb the control function. It is the simplest but not the only way to verify these changes by tasting the belt tension.

I claim:

1. V-belt pulley with a variable effective radius, designed for use as a component in a variable transmission or variator and used with a V-belt or a like, comprising:
a pair of conical sheaves pressing flanks of the V-belt laterally between respective surfaces thereof contacting the flanks of the V-belt and
associated bearings means for mounting said sheaves so that, in a non-loaded state, respective axes of revolution of the sheaves do not coincide but are intersecting or skewed, and the axes of revolution of the sheaves are rotatably variable with respect to one another in the direction of rotation of the pulley.

2. V-belt pulley according to claim 1, characterized in that the bearings means includes a means for varying a degree of divergence of the sheaves.

3. V-belt variator with at least one variable pulley as claimed in claim 2, characterized in that the divergence of the sheaves is caused by a freely rotating member wedging radially between a specific auxiliary wedge ring and a rear side of at least one of the sheaves.

4. V-belt variator according to claim 3, characterized in that there are a plurality of the members adjusting the wedge ring determining the divergence of the sheaves and these members are symmetrically placed and mounted with bearings on levers controlled by belt tensioning rollers.

5. V-belt variator according to claim 3, characterized in that an action of a mechanism producing the divergence of the sheaves is independent of a direction of a loading torque.

6. V-belt pulley according to claim 1, for a bicycle variator, in which an axial force acting between the sheaves is produced by means of a multi-end thread and at least one pressure spring, characterized in that an eccentric variable spring force is exerted on the movable sheave by a roller rolling against a rear side of the sheave.

7. V-belt pulley according to claim 1 for a bicycle variator, in which said bearings means mount said sheaves such that one of the sheaves is axially movable while the other is fixed, said bearings means being characterized in that the movable sheave is supported by needle bearings on a bicycle frame while the fixed sheave is supported on the movable sheave by at least one sliding bearing and on the bicycle frame by a grooved ball bearing with eccentrical mountings securing its outer ring.

8. V-belt pulley according to claim 7, in which part of an axial force acting between the sheaves is produced by a notched cup spring, characterized in that an eccentric pinpoint force is exerted on the movable sheave by a roller rolling against a rim of the cup spring.

9. Variable transmission or variator for use with a V-belt or a like, comprising:
at least a driving pulley which has a variable effective radius and consists of a pair of conical sheaves pressing flanks of the V-belt laterally between a bolt groove provided by them and
associated bearings means for mounting said sheaves such that, in a non-loaded state, respective axes of revolution of the sheaves do not coincide, and the belt groove between the sheaves is wider at a point of exit of the belt than at a point of entry of the belt.

10. Variable transmission according to claim 9, characterized in that the belt touches the driving pulley at a point at least 10 degrees or 0.17 radians before a point where the groove between the sheaves is narrowest.

11. Variable transmission or variator according to claim 9 in which said bearings means mount said sheaves such that one of the sheaves is axially movable while the other is fixed, said bearings means being characterized in that the movable sheave is supported by needle bearings on a bicycle frame while the fixed sheave is supported on the movable sheave by at least one sliding bearing and on the bicycle frame by a grooved ball bearing with eccentrical mountings securing its outer ring.

12. Variable transmission or variator according to claim 11 in which an axial force acting between the sheaves is produced by a notched cup spring, characterized in that an eccentric pinpoint force is exerted on the movable sheave by a roller rolling against a rim of the cup spring.

13. Variable transmission or variator according to claim 9 in which an axial force acting between the sheaves is produced by means of a multi-end thread and at least one pressure spring, characterized in that an eccentric variable spring force is exerted on the movable sheave by a roller rolling against a rear side of the sheave.

14. Variable transmission or variator according to claim 9, characterized in that a divergence of the sheaves is caused by a freely rotating member wedging radially between a specific auxiliary wedge ring and a rear side of at least one of the sheaves.

15. Variable transmission or variator according to claim 14, characterized in that there are a plurality of the members adjusting the wedge ring determining the divergence of the sheaves and these members are symmetrically placed and mounted with bearings on levers controlled by belt tensioning rollers.

16. Variable transmission or variator according to claim 14, characterized in that an action of a mechanism producing the divergence of the sheaves is independent of a direction of a loading torque.

17. Variable transmission or variator for use with a V-belt or a like, comprising:
    at least a driven pulley which has a variable effective radius and consists of a pair of conical sheaves pressing flanks of the V-belt laterally between a belt groove provided by them and
    associated bearings means for mounting said sheaves such that, in a non-loaded state, respective axes of revolution of the sheaves do not coincide, and the belt groove between the sheaves is narrower at a point of exit of the belt than at a point of entry of the belt.

18. Variable transmission according to claim 17, characterized in that the belt leaves the driven pulley at a point at least 10 degrees or 0.17 radians after a point where the groove between the sheaves is narrowest.

19. Variable transmission or variator according to claim 17, characterized in that a divergence of the sheaves is caused by a freely rotating member wedging radially between a specific auxiliary wedge ring and a rear side of at least one of the sheaves.

20. Variable transmission or variator according to claim 19, characterized in that there are a plurality of the members adjusting the wedge ring determining the divergence of the sheaves and these members are symmetrically placed and mounted with bearings on levers controlled by belt tensioning rollers.

21. Variable transmission or variator according to claim 19, characterized in that an action of a mechanism producing the divergence of the sheaves is independent of a direction of a loading torque.

* * * * *